(12) United States Patent
Moskalev

(10) Patent No.: US 6,343,851 B2
(45) Date of Patent: Feb. 5, 2002

(54) K REPLACEMENT FOR COLOR DIGITAL IMAGE PRINTING

(75) Inventor: Anatoly Moskalev, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/746,965

(22) Filed: Dec. 21, 2000

Related U.S. Application Data

(63) Continuation of application No. 09/192,818, filed on Nov. 16, 1998, now abandoned.

(51) Int. Cl.$^7$ .............................. B41J 2/21; B41J 29/393
(52) U.S. Cl. ............................................ 347/43; 347/19
(58) Field of Search ...................... 347/43, 19; 358/1.9, 358/515, 520

(56) References Cited

U.S. PATENT DOCUMENTS

| | | | |
|---|---|---|---|
| 5,070,413 A | | 12/1991 | Sullivan, et al. ............ 358/456 |
| 5,305,119 A | * | 4/1994 | Rolleston et al. ............ 358/1.9 |
| 5,696,611 A | | 12/1997 | Nishimura, et al. ......... 358/518 |
| 6,157,462 A | * | 12/2000 | Fan ............................. 358/1.9 |

FOREIGN PATENT DOCUMENTS

EP             0591977 A1     10/1993

OTHER PUBLICATIONS

T.M. Holladay, "Digital Techniques for Producing Under–Colored Halftone Images", *Xerox Disclosure Journal*, vol. 8, No. 6, Nov. 1983 –Dec. 1983, p. 531.

\* cited by examiner

*Primary Examiner*—Thinh Nguyen
(74) *Attorney, Agent, or Firm*—Akin, Gump, Strauss, Hauer & Feld, L.L.P.

(57) ABSTRACT

K replacement for color digital image printing reduces the computational complexity and processing resource requirements of an image printing system. The invention is implemented using a variety of devices capable of reproducing image data including color photo-copy machines, color facsimiles, color printers, black and white printers, and digital printers. The image printing system is employed in a multi-functional peripheral capable of performing several functions. The image printing system detects whether or not ink is to be printed using all of the available print channels in the system. If ink is to be printed using a predetermined number of the print channels, the image printing system performs K replacement and applies error diffusion to a predetermined number of the print channels. In certain embodiments, K replacement is performed only when the spectral content of a given pixel falls within a predetermined range of a spectrum. This spectrum may be a color spectrum wherein the spectrum varies across the entire visible spectrum. Alternatively, the spectrum can be an intensity spectrum wherein the spectrum varies from a highest intensity to a lowest intensity.

21 Claims, 4 Drawing Sheets

K REPLACEMENT FOR COLOR DIGITAL IMAGE PRINTING

CROSS REFERENCE TO RELATED APPLICATIONS

The present application is a continuation of U.S. patent application Ser. No. 09/192,818 entitled "K REPLACEMENT FOR COLOR DIGITAL IMAGE PRINTING," filed Nov. 16, 1998, now abandoned. All of such application is hereby incorporated herein by reference in its entirety, including any drawings and appendices, and is made part of the present U.S. Patent Application for all purposes.

BACKGROUND

1. Technical Field

The present invention relates generally to digital image printing; and, more particularly, it relates to K replacement within digital image printing systems.

2. Related Art

Conventional printing systems that employ K replacement typically have at least four channels. These channels most often distribute cyan, yellow, and magenta ink on a printing medium. Examples of printing media include paper and film on which ink is placed to generate a substantially imperceptible reproduction of a plurality of image data. The combination of these three inks together, ideally, results in a substantially black color. However, various undesirable results occur when the three inks are placed simultaneously on the printing medium. Because the actual inks used in a printing system are not themselves spectrally pure, the combination of the three non-black inks generates a color that is often not truly black. Additionally, the printing of three ink pixels on top of one another often wets the paper and results degraded image reproduction. A fourth channel, a black channel typically referred to as a K channel, is used to overcome these problems associated such printing system. The K replacement method typically detects when all three of the inks are to be used to print in a given pixel.

Typically, an error diffusion method is performed to all the four channels of such a printing system. During the computational process, the K replacement is only performed when all of the channels are to print ink in a given pixel. Still, error diffusion processing is also often performed using the fourth channel, despite it being a residual ink channel. The use of four channels in conventional systems requires the dedication of increased processing resources than that which is required by the three channels themselves. The conventional method of performing error diffusion on all four of the channels is invariably cost prohibitive in some applications in that the cost budget simply cannot accommodate the addition of the processing resources required to perform the error diffusion on the fourth channel.

Further limitations and disadvantages of conventional and traditional systems will become apparent to one of skill in the art after reviewing the remainder of the present application with reference to the drawings.

SUMMARY OF THE INVENTION

Various aspects of the present invention can be found in an image processing system that converts a plurality of image data into a form suitable for printing. The invention takes in the plurality of data into the image processing and operates on the plurality of data to convert it so that it may be displayed or reproduced on a printing medium. In certain embodiments of the invention, the printing medium is paper in which a printer deposits at least one of either ink, wax, or some other medium that leaves a visibly perceptible modification to the printing paper for viewing of the plurality of image data in a manner substantially similar to the actual and original representation of the plurality of image data.

In certain embodiments of the invention, the image processing system may be contained within a multi-functional peripheral. The multi-functional peripheral device is a peripheral device containing a plurality of internal devices wherein each of the devices operates either independently or cooperatively to process the plurality of image data.

In other embodiments, the invention includes a method that employs K replacement to a plurality of pixels that are generated using the image processing system. In certain embodiments, the image processing system detects whether or not ink is to be printed using all of the available print channels in the system. If ink is to be printed using a predetermined number of the channels, then the image printing system performs K replacement.

Additionally, error diffusion is applied to the predetermined number of the channels. In certain embodiments, the error diffusion utilizes a predetermined threshold mask to diffuse the error to pixels adjacent to the pixel. Alternatively, the predetermined threshold mask is used to diffuse the error to pixels that are not immediately adjacent to the pixel. In either embodiment, the error is diffused to pixels contained within the plurality of image data.

In certain embodiments, K replacement is performed only when the spectral content of a given pixel falls within a predetermined range of a spectrum. This spectrum may be a color spectrum wherein the spectrum varies across the entire visible spectrum in certain embodiments. In other embodiments, the spectrum is an intensity spectrum wherein the spectrum varies from a highest intensity to a lowest intensity. The characteristic of the pixel is intensity in certain embodiments of the invention. In other embodiments, it is a color component of the pixel.

Other aspects, advantages and novel features of the present invention will become apparent from the following detailed description of the invention when considered in conjunction with the accompanying drawings.

DETAILED DESCRIPTION OF THE INVENTION

Figure 1:
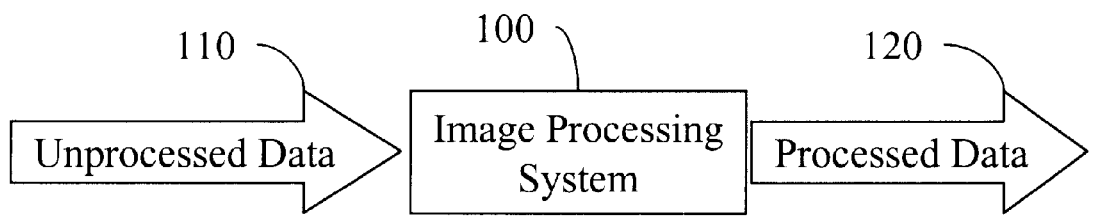
FIG. 1 is a system diagram illustrating an embodiment of an image processing system built in accordance with the present invention that takes in a plurality of unprocessed data and outputs a plurality of processed data.

FIG. 1 is a system diagram illustrating an embodiment of an image processing system 100 built in accordance with the present invention that takes in a plurality of unprocessed data 110 and outputs a plurality of processed data 120. The image processing system 100 is processing circuitry that performs the loading of the plurality of unprocessed data 110 into a memory from which selected portions of the plurality of unprocessed data 110 are processed in a sequential manner. The processing circuitry possesses insufficient processing capability to handle the entirety of the plurality of unprocessed data 110 at a single, given time. The processing circuitry may employ any method known in the art that transfers data from a memory for processing and returns the plurality of processed data 120 to the memory.

In certain embodiments of the invention, the image processing system 100 is a system that converts raw image data into image data suitable for printing. Various devices may be used to perform the printing including color photo-copy machines, color facsimiles, color printers, black and white printers, and digital printers. In other embodiments of the invention, the image processing system 100 is a system that converts raw image data into image data suitable for display. Various displays may be used in accordance with the present invention including monitors and other media capable of dilating digital image data. The image processing system 100 converts image data that is already in a form suitable for printing, yet additional processing is performed to improve the visible perceptual quality of the image for reproduction.

Figure 2:
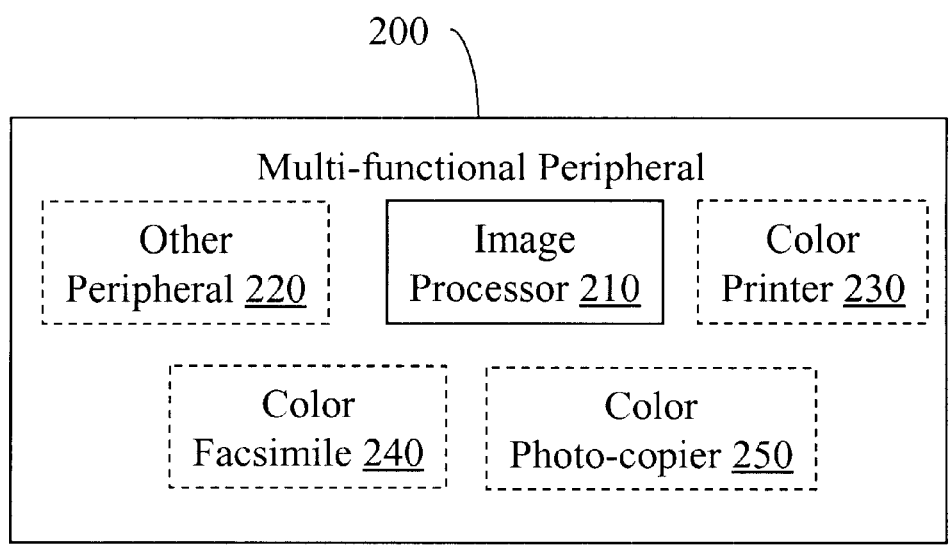
FIG. 2 is a system diagram of an embodiment built in accordance with the present invention of a multi-functional peripheral that contains an image processor.

FIG. 2 is a system diagram of an embodiment built in accordance with the present invention of a multi-functional peripheral 200 that contains an image processor 210. Additional peripheral devices may be included in the multi-functional peripheral 200 to perform additional functions. The multi-functional peripheral 200 may contain any number of devices that cooperatively perform processing using the image processor 210 to prepare image data in a form suitable for printing or display wherein the image data are of a high visible perceptual quality. Examples of such devices include color photo-copy machines, color facsimiles, color printers, black and white printers, and digital printers.

In certain embodiments of the invention, the multi-functional peripheral 200 contains several of the devices described above. A color printer 230 is included in the multi-functional peripheral 200. A color photo-copier 250 and a color facsimile 240 are both contained in the multi-functional peripheral 200 thereby providing multiple functions all within a single device. Those having skill in the art will recognize that any other peripheral 220 could be similarly included in the multi-functional peripheral 200 without departing from the scope and spirit of the invention.

In certain embodiments, the multi-functional peripheral 200 provides a system in which various devices serve one another in receiving data in one form and converting it into another for appropriate display, reproduction, or transmission. The color photo-copier 250 converts the plurality of unprocessed data 110 to the plurality of processed data 120 having an enlarged size. The plurality of processed data 120 having an enlarged size is then input into the color facsimile 240 wherein it may be viewed as the plurality of unprocessed data 110. The color facsimile 240 converts the plurality of unprocessed data 110 to a form suitable for transmission to an external device (not shown). Those having skill in the art will recognize that the image processing system 100, as described in FIG. 1, is contained within the multi-functional peripheral 200 in many of the various embodiments of the invention.

Figure 3:
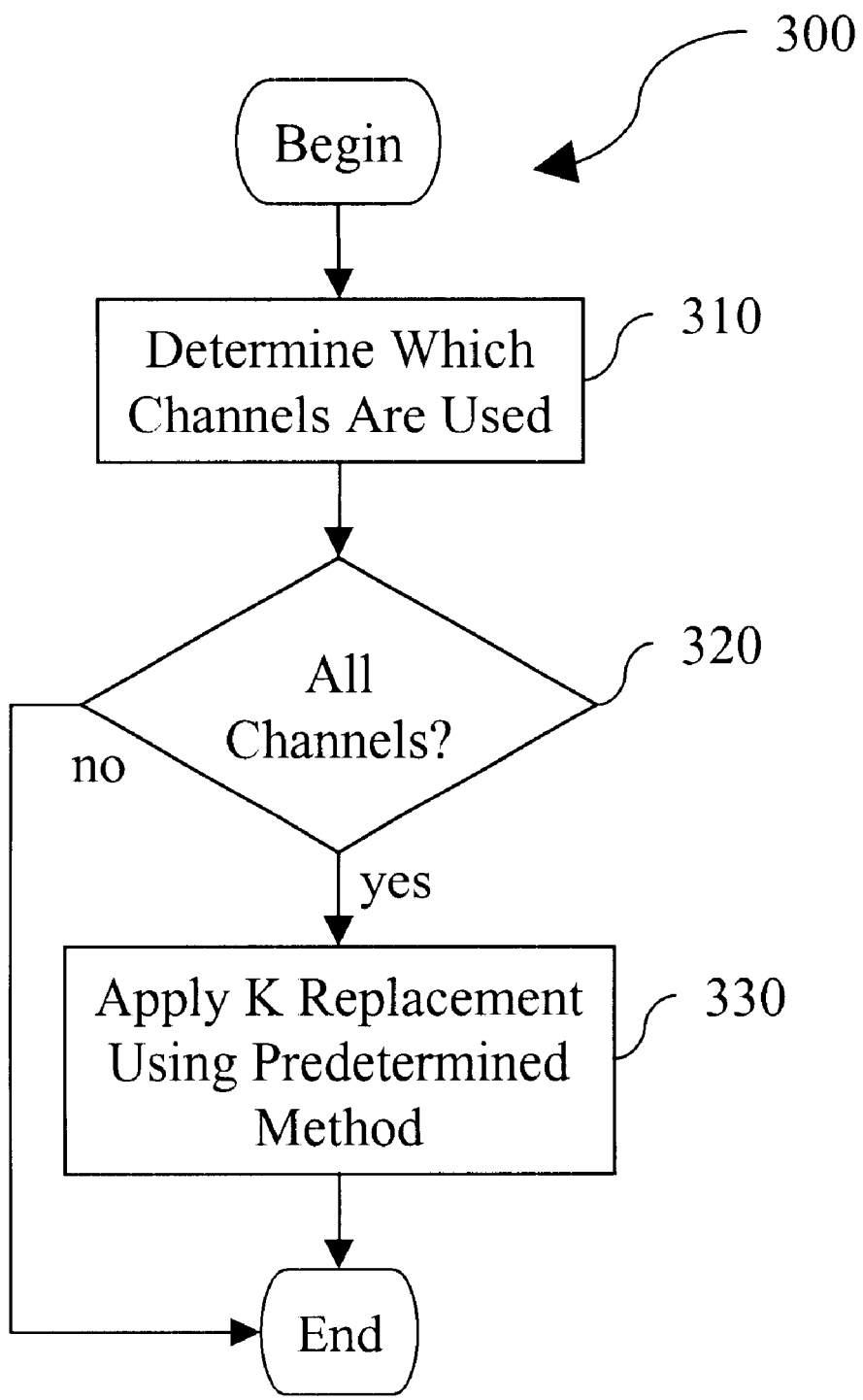
FIG. 3 is a functional block diagram illustrating a K replacement method performed in accordance with the present invention.

FIG. 3 is a functional block diagram illustrating a K replacement method 300 performed in accordance with the present invention. In a block 310, it is determined which of a plurality of channels will print in a given pixel. Within systems that employ the printing inks cyan, yellow, magenta, and black as the residual K channel, it is determined which of the three channels of cyan, yellow, and magenta will in fact print within a pixel. In a decisional block 320, it is determined whether or not all three of the channels will print in the pixel. If all of the channels will print within the pixel, then the K replacement method 300 continues onto a block 330 wherein K replacement is performed using a predetermined method. Alternatively, if at least one of the channels will not print within the pixel, then the K replacement method 300 terminates without performing K replacement. Another pixel may be selected and the K replacement method 300 repeated using that pixel in certain embodiments of the invention. The predetermined method for performing K replacement includes performing error diffusion using only those non-black channels, namely, cyan, yellow, and magenta. That is to say, the error diffusion of the black or K channel is absorbed into the non-black channels and the corresponding change of error, as calculated in performing the error diffusion, is maintained in the non-black channels. By absorbing the error into the non-black channels, the processing resource requirements of the printing system are reduced by at least one channel. The cost savings provided by requiring less computational hardware provides for application of the K replacement method 300 into certain areas where printing systems that apply error diffusion simply cannot be applied.

In certain embodiments of the invention, more channels than the three channels of cyan, yellow, and magenta are used. For example, a printing system accounts for the spectral impurity of available inks and maintains additional so-called colors that result from various combinations of the three inks cyan, yellow, and magenta, e.g. the combination of two of the colors, when combined using one to one ratio, produces an unexpected result and this color combination is then retained as being a fourth color. The combination of any two of the three colors in a predetermined amount should itself produce a predictable color, but because of the spectral impurity of real inks, this is often not the case. Any number of combinations that result in expected results may be used in such a printing system. The K replacement method 300 is nevertheless applies to printing systems having more channels than simply cyan, yellow, magenta, and black,. In other embodiments of the invention, the printing system employs more channels than the cyan, yellow, magenta, and black, yet the extra channels are not combinations of the three colors cyan, yellow, magenta. Additional colors selected from the visible spectrum are employed in such embodiments. Those having skill in the art will recognize that K replacement method 300 may be applied to printing systems employing any number of channels and channels having any combination of colors.

Figure 4:
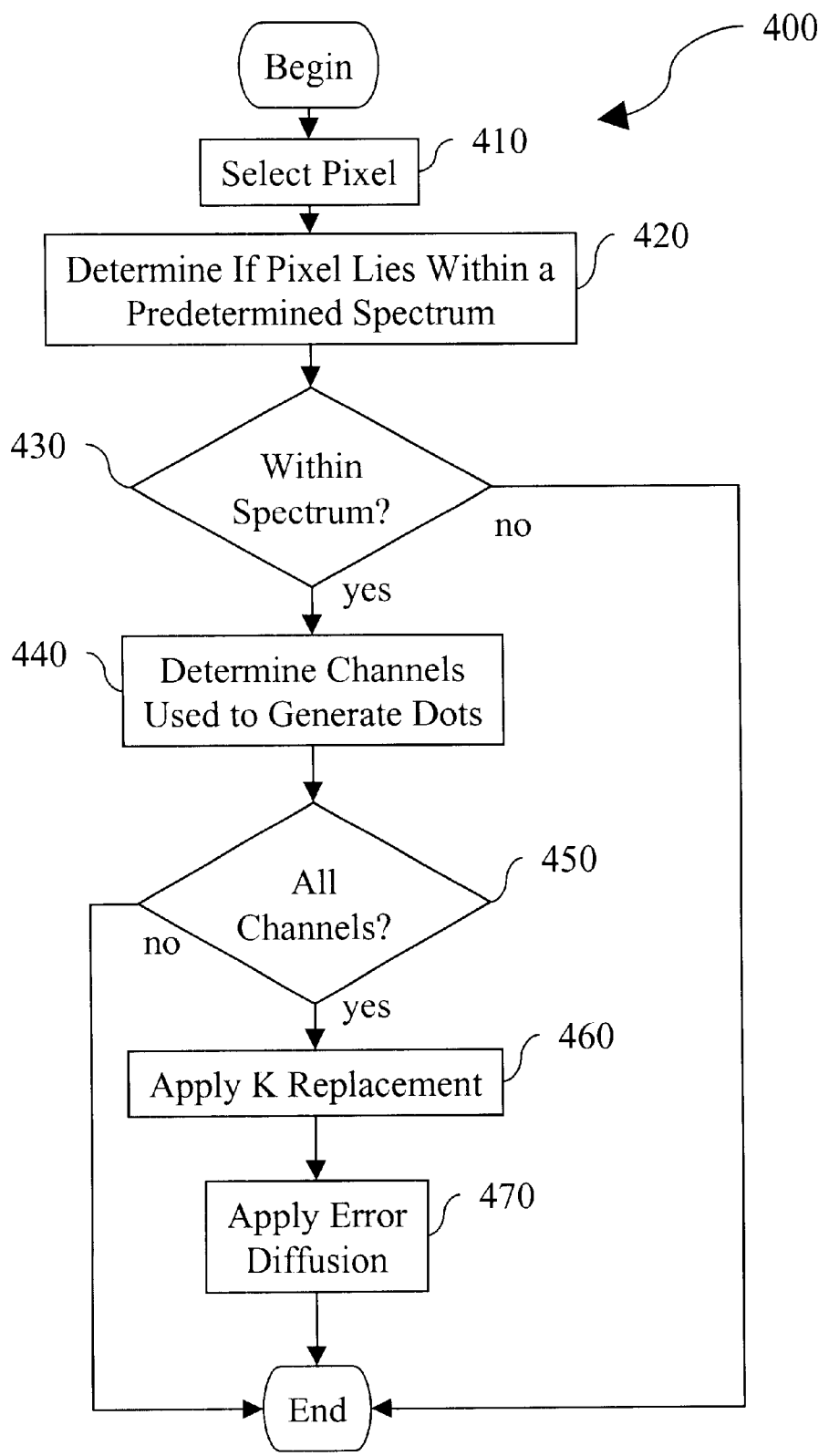
FIG. 4 is a functional block diagram illustrating another K replacement method performed in accordance with the present invention.

FIG. 4 is a functional block diagram illustrating another K replacement method 400 that is performed in accordance with the present invention. In a block 410, a pixel is selected. Typically, the pixel is selected from a plurality of pixels that form image data. In a block 420, the color content of the pixel is analyzed to determine if it lies within a predetermined spectrum. The predetermined spectrum is a color range of substantially gray or black within the visible spectrum is this embodiment of the invention. If the pixel's color content does not lie within the predetermined spectrum, then the decisional block 430 terminated the K replacement method 400. If however, the color content of the pixel does lie within the predetermined spectrum, then the decisional block 430 directs the K replacement method 400 to determine which channels will be used for printing the pixel in a block 440.

For printing systems employing cyan, yellow, and magenta ink, the block 440 determines which of the three channels are required to print the pixel. If at least one of the channels will not be used to print the pixel, then a decisional block 450 terminates the K replacement method 400. Another pixel may be selected to repeat the K replacement method 400. Alternatively, if all of the channels will be used to print the pixel as determined in the decisional block 450, K replacement is performed in a block 460. Error diffusion is also performed in a block 470.

Error diffusion generates a pseudo random pixel structure having intermediate levels of at least one characteristic of a predetermined number selected from a plurality of pixels. The intermediate level of a given pixel is adapted to a nearest value of the at least one characteristic that can be generated using the available resources of the printing system. The difference between the actual pixel information and the nearest at least one characteristic that is chosen to print the pixel is recorded and this difference is an error to which the error diffusion method is applied. The error is spread or diffused over pixels adjacent to the pixel used in a predetermined mask. In some printing systems, the at least one characteristic is the intensity of the pixel. In others, it is a color component of the pixel. In certain embodiments employing error diffusion in the block 470, a predetermined threshold mask diffuses the error to pixels adjacent to the pixel. In other embodiments, the predetermined threshold mask is used to diffuse the error to pixels that are not immediately adjacent to the pixel.

In certain embodiments, of the invention, the predetermined spectrum is a range of the visible spectrum. For example, the predetermined spectrum is a substantially gray and black range of the visible spectrum. If the pixel lies within a predetermined range of the visible spectrum that is substantially gray and black range, then the K replacement method 400 continues to determine which channels are required to print the pixel in the block 440. Similar to the K replacement method 300 of FIG. 3, the K replacement method 400 may be performed within printing systems having more channels than simply cyan, yellow, and magenta. Additionally, any combination of colors may be employed using the K replacement method 400.

Figure 5:
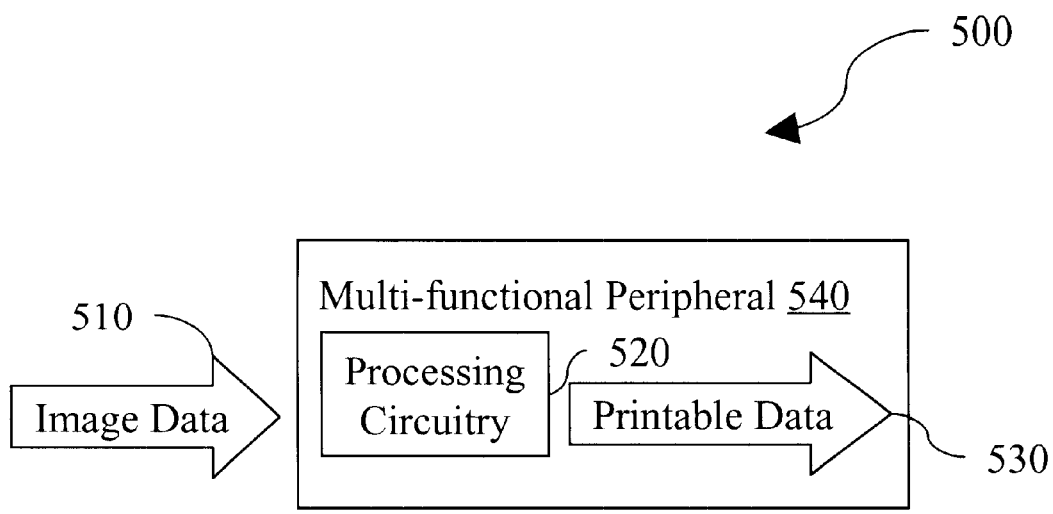
FIG. 5 is a system diagram illustrating another embodiment built in accordance with the present invention of a multi-functional peripheral that performs image processing to make a plurality of data suitable for printing.

FIG. 5 is a system diagram illustrating another embodiment 500 built in accordance with the present invention of a multi-functional peripheral 540 that performs image processing to make a plurality of data suitable for printing. The multi-functional peripheral 540 is the multi-functional peripheral 200 as described in FIG. 2. The multi-functional peripheral 540 contains processing circuitry 520 that is used to process a plurality of image data 510. The multi-functional peripheral 540 converts the plurality of image data 510 into a plurality of printable data 530. The plurality of printable data 530 is in a form suitable for printing on color ink jet printers in certain embodiments of the invention. In other embodiments, it is in a form suitable for laser printers. In certain embodiments of the invention, the processing circuitry 520 is the image processor 210 as described in FIG. 2. In other embodiments, it is internal processing resources contained within any of the devices contained within the multi-functional peripheral 200 of FIG. 2 including the any other peripheral 220.

Figure 6:
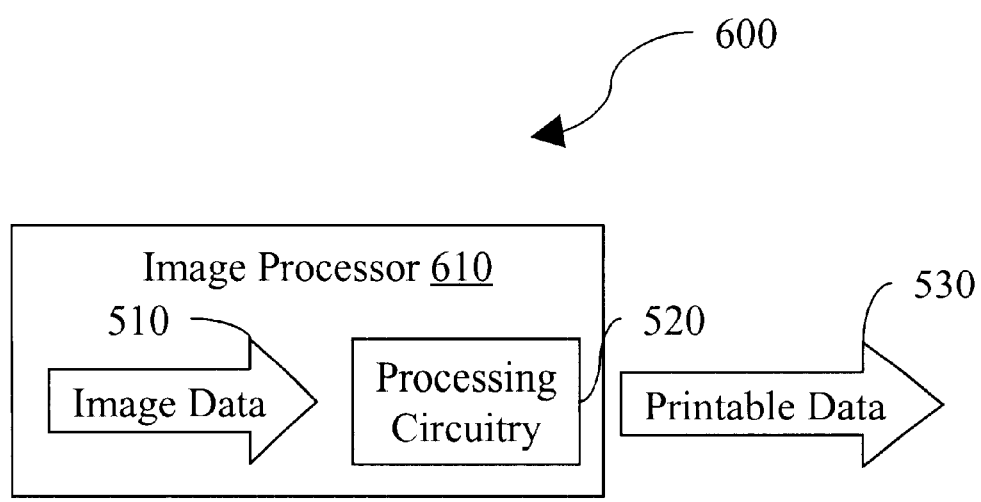
FIG. 6 is a system diagram illustrating another embodiment built in accordance with the present invention of an image processor that prepares a plurality of data in a form suitable for printing.

FIG. 6 is a system diagram illustrating another embodiment 600 built in accordance with the present invention of an image processor 610 that prepares a plurality of data in a form suitable for printing. The image processor 610 contains the processing circuitry 520. In certain embodiments, the image processor 610 is substantially the same as the image processor 210 as described in the multi-functional peripheral 200 of FIG. 2. The processing circuitry 520 is used to process the plurality of image data 510 into the plurality of printable data 530. In certain embodiments of the invention, the image processor 610 is a processing system internal to any of the devices contained within the multi-functional peripheral 200 of FIG. 2 including the any other peripheral 220.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. An image processing method, comprising:
   determining if a color content of a pixel lies within a predetermined spectrum;
   determining when all of a plurality of channels are designated to print in a pixel when the color content of the pixel lies within the predetermined spectrum; and
   applying K replacement when the plurality of channels are all designated to print in the pixel and when the color content of the pixel lies within the predetermined spectrum.

2. The method of claim 1, further comprising applying error diffusion.

3. The method of claim 2, wherein the error diffusion is performed using a predetermined threshold mask.

4. The method of claim 2, wherein the error diffusion generates a pseudo random pixel.

5. The method of claim 2, wherein the error diffusion is directed solely at the plurality of channels.

6. The method of claim 1, wherein the predetermined spectrum comprises a color range of substantially gray.

7. The method of claim 1, wherein the plurality of channels is operable to print a plurality of colors.

8. The method of claim 6, wherein the plurality of colors comprises cyan, yellow, and magenta.

9. The method of claim 1, further comprising replacing the plurality of channels with an additional channel to print in the pixel when it is determined that all of the plurality of channels are designated to print in the pixel.

10. An image processing system, comprising:
    an image processor that determines when all channels within a plurality of channels are designated to print in a pixel;
    the image processor replaces the plurality of channels with an additional channel to print in the pixel when it is determined that all channels within the plurality of channels are designated to print in the pixel; and
    the image processor absorbs an error, associated with the additional channel, into the plurality of channels.

11. The image processing system of claim 10, wherein the additional channel comprises a channel that is operable to print a pixel having a substantially black color.

12. The image processing system of claim 10, wherein the image processor determines if a color content of a pixel lies within a predetermined spectrum.

13. The image processing system of claim 10, wherein the plurality of channels is operable to print a plurality of colors.

14. The image processing system of claim 13, wherein the plurality of colors comprises cyan, yellow, and magenta.

15. The image processing system of claim 10, wherein the image processor determines when at least one channel of the plurality of channels is not designated to print in the pixel; and the image processor selects a next pixel when the at least one channel of the plurality of channels is not designated to print in the pixel.

16. The image processing system of claim 10, wherein the image processing system comprises a multi-functional peripheral.

17. An image processing method, comprising:

determining when all channels within a plurality of channels are designated to print in a pixel;

replacing the plurality of channels with an additional channel to print in the pixel when it is determined that all channels within the plurality of channels are designated to print in the pixel; and absorbing an error, associated with the additional channel, into the plurality of channels.

18. The method of claim 17, further comprising determining if a color content of the pixel lies within a predetermined spectrum.

19. The method of claim 17, further comprising generating a pseudo random pixel.

20. The method of claim 17, wherein the plurality of channels is operable to print a plurality of colors.

21. The method of claim 20, wherein the plurality of colors comprises cyan, yellow, and magenta.

\* \* \* \* \*